(12) United States Patent
Franchino

(10) Patent No.: US 8,028,012 B1
(45) Date of Patent: Sep. 27, 2011

(54) DOMINOS CALCULATOR

(76) Inventor: Peter Franchino, Grass Valley, CA (US)

( * ) Notice: Subject to any disclaimer, the term of this patent is extended or adjusted under 35 U.S.C. 154(b) by 1203 days.

(21) Appl. No.: 11/786,520

(22) Filed: Apr. 11, 2007

(51) Int. Cl.
*G06F 15/02* (2006.01)

(52) U.S. Cl. ........ 708/131; 463/11; 446/143; 273/148 R

(58) Field of Classification Search .................. 708/131; 463/11
See application file for complete search history.

(56) References Cited

U.S. PATENT DOCUMENTS

| | | | |
|---|---|---|---|
| 2,095,161 A * | 10/1937 | Vana | 235/121 |
| 4,130,871 A | 12/1978 | Olsen et al. | |
| 4,266,214 A | 5/1981 | Peters, Jr. | |
| 4,367,526 A | 1/1983 | McGeary et al. | |
| 5,377,982 A | 1/1995 | Villarreal, Jr. | |
| 5,384,561 A * | 1/1995 | Smith | 340/323 R |
| 5,559,490 A | 9/1996 | McDonald et al. | |
| D388,002 S | 12/1997 | Caesar | |
| 5,938,528 A | 8/1999 | Glapion | |

OTHER PUBLICATIONS

Stadsman, Calculator, Jan. 8, 2007, www.worth1000.com.*
Aldweb, Numerous v1.2, Oct. 2001, Freeware Palm, p. 1.*

* cited by examiner

*Primary Examiner* — Lewis A Bullock, Jr.
*Assistant Examiner* — Kevin Hughes
(74) *Attorney, Agent, or Firm* — Richard V. De Gruccio, Esq.

(57) ABSTRACT

This is a calculator for tabulating the score in the game of dominos or other tile or card games, wherein the score is determined by symbols or colors rather than numerals, comprising a housing, a display panel, a control panel having a plurality of mathematical function keys and input keys, wherein the input keys have symbols or colors corresponding to the symbols or colors on the game pieces.

4 Claims, 1 Drawing Sheet

DOMINOS CALCULATOR

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation of its rights pursuant to 37 C.F.R. §1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates generally to calculators for keeping score in a game that requires counting marks on a game tile, and more specifically to calculators for keeping score in the game of dominos.

2. Description of Related Art

Many games require the tallying up of points to determine the score for each player or team. There are many different ways scores are determined. In the game of baseball, for example, the score is determined by the number of runs, i.e., the number of times a player advances through the bases and crosses home plate. In the game of golf, the score is generally determined by how many strokes or swings of the golf club are required to place the golf ball into the hole. In the game of darts, the score is generally determined by adding the corresponding values of enumerated spaces where the thrown darts land.

In the game of dominos, however, the score is oft times determined by tabulating the number of pips or dots on certain game pieces. The game pieces are known as tiles or bones. Each tile, typically rectangular in shape, generally has two sets of dots, one set on each end. The number of dots on each end typically ranges from zero to fifteen. To tabulate the number of total dots per tile, some individuals are able to simply recognize the pattern of the dots on each tile. For others, however, tabulating the number of dots may require the painstaking task of counting each individual dot. It would be beneficial, however, to have a device that would simplify tabulation of the number of dots.

Glapion, in U.S. Pat. No. 5,938,528, reveals a self-contained electronic dominos game. The scoring on this invention is computed automatically. There are no separate game pieces. Hence, Glapion's invention does not have application for the original or standard game of dominos.

Caesar, in U.S. Pat. No. D388,002, reveals a dominos scorekeeping board that appears to utilize manual sliding tabs to be positioned at certain locations corresponding with certain numerals. However, this disclosure does not relieve the player from having to tabulate each individual dot to determine a score.

Other electronic devices have been introduced that assist in the scoring of other games. For example, Peters, Jr., in U.S. Pat. No. 4,266,214, McGeary et al., in U.S. Pat. No. 4,367,526, and Villarreal, Jr., in U.S. Pat. No. 5,377,982, introduce electronic scoring devices for athletic games, particularly baseball and golf. The patent disclosed by McGeary et al. essentially discloses a calculator modified for specific use in the game of golf. These devices allow input of a score by depressing a score key identified by a given numeral.

McDonald et al., in U.S. Pat. No. 5,559,490, discloses an electronic scoring apparatus for dart games. Olsen et al., in U.S. Pat. No. 4,130,871, discloses a scoring apparatus for the game of bridge. Again, these apparatuses allow input of a score by depressing a score key identified by a given numeral.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

Thus, it appears that a need exists for an electronic dominos calculator that allows for simple score tabulation by correlating the pattern of dots on a bone with a pattern of dots on a score key.

BRIEF SUMMARY OF THE INVENTION

The dominos calculator of the present invention is adapted to overcome the above-noted shortcomings and to fulfill the stated needs. The calculator comprises a housing, a control panel, a display panel, scoring input means and function means to perform mathematical operations. The scoring input means comprises a plurality of input keys displaying symbols corresponding to symbols on the game tiles.

It is an object of the present invention to provide a dominos calculator that that is not yet available for tabulating the score in the game of dominos.

It is a further object of the present invention to provide a dominos calculator that will allow for simple tabulation of the score in the game of dominos by requiring only the recognition of the pattern of dots on the game tiles instead of counting individual dots.

Yet another object of the present invention to provide a dominos calculator that will allow for tabulation of the score by depressing a score key that has the same pattern of dots as a game tile.

Yet a further object of this invention is to provide a dominos calculator that is inexpensive.

Still another object of the present invention is to provide a dominos calculator that can be combined with a new game of dominos or can be an accessory to be used with a pre-owned game of dominos.

Further objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
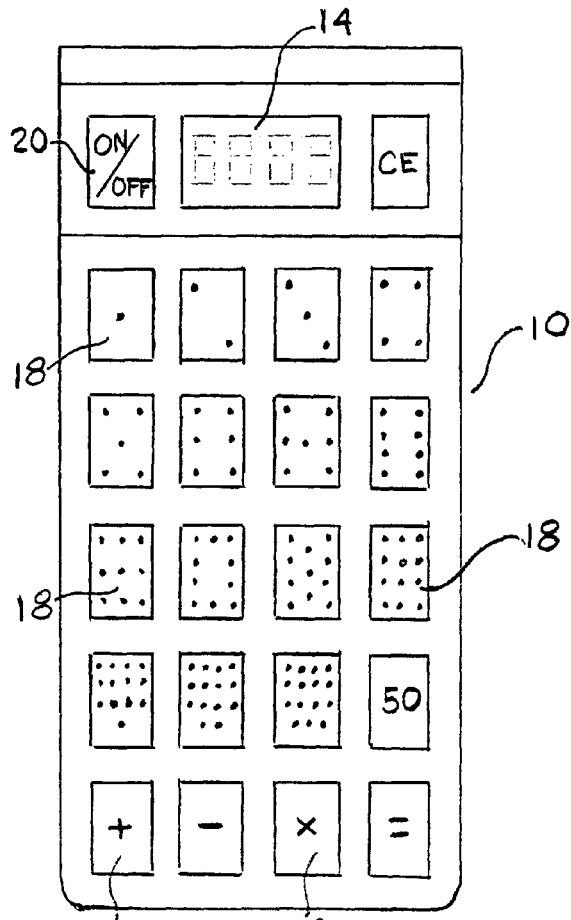
FIG. 1 is a perspective view of one embodiment of the dominos calculator of the present invention.
Figure 2:
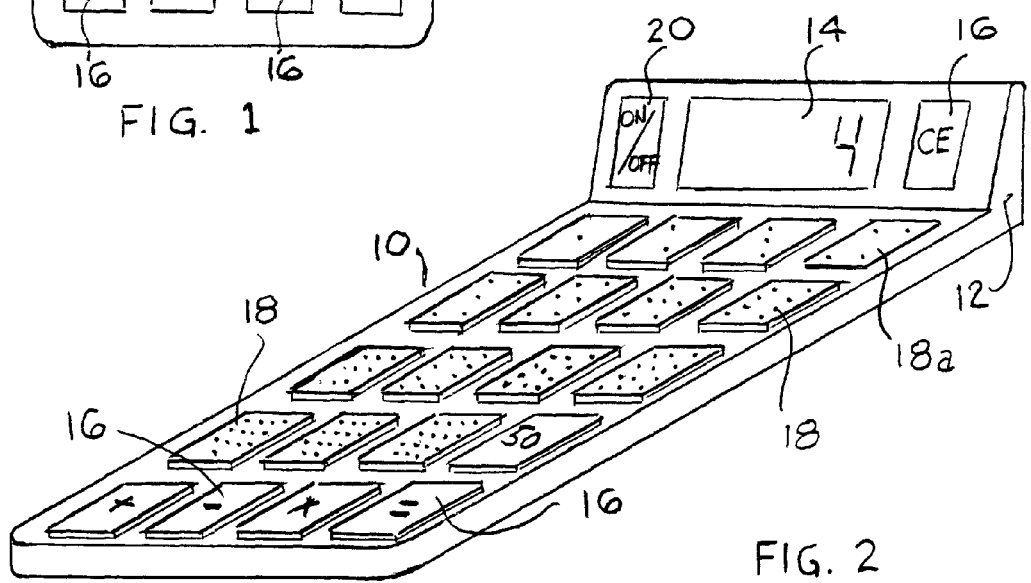
FIG. 2 is a plan view of one embodiment of the dominos calculator of the present invention.

Referring more specifically to the drawings, for illustrative purposes the present invention is embodied in the apparatus generally shown in FIG. 1 through FIG. 2. It will be appreciated that the apparatus may vary as to configuration and as to details of the parts, and that the method may vary as to the specific steps and sequence, without departing from the basic concepts as disclosed herein.

Referring now specifically to the drawings, FIGS. 1 through FIG. 2 show the inventive dominos calculator, which is generally identified herein with the reference numeral 10. Usually, but not exclusively, the inventive apparatus is to be used for the game of dominos. However, the calculator is contemplated to be adaptable for use in other similar games using shapes or figures instead of numbers. Such games may include, for example, other tile games or playing card games. For illustrative purposes, however, the subject invention will be described in terms of a dominos calculator.

The calculator 10 is comprised of a housing 12, which is comprised of a display screen 14, function keys 16, and input keys 18. It is contemplated that the calculator 10 will be portable or handheld.

The function keys 16 are anticipated to include simple arithmetic functions, such as an addition key, a subtraction key, a multiplication key and a division key. The function keys 16 are also anticipated to include a total or equal key and a clear data key.

The input keys 18 are comprised of a plurality of keys each having a pre-designated numerical value. It is contemplated that each individual input key will have a different numerical value representative of each possible set of numerical values displayed on the dominos game tiles.

The display screen 14 is contemplated to be a liquid crystal display screen, as is often used for calculators. However, other display media is also contemplated for use that is currently available or may become available.

As is generally known in the art for portable or handheld calculators, the display screen 14, function keys 16, and inputs keys 18 are integrated with electronic circuitry (not shown) installed within the housing 12. Furthermore, as is also generally known in the art, a power source (not shown), such as a battery, is also contemplated to be contained within the housing 12 and electronically integrated with the display screen 14, function keys 16, and input keys 18. The power source would be activated by an On/Off key 20. It is also contemplated that the power source may also be light activated, such as a solar battery.

Commonly, each input key of a calculator has a pre-designated numerical value represented by a numeral symbol located on or near the input key. For example, a key designated for the value of "five" would be identifiable by the numeral symbol of "5".

In this invention, the input keys 18 have indicia that similarly correspond to pre-designated numerical values. However, the indicia on these input keys 18 correspond to various patterns of dots on the dominos game tiles. Specifically, as discussed earlier, dominos game tiles typically have two sets of arrangements of dots. Each set may range from zero dots up to six dots or even fifteen dots. The dots are typically in a pre-designated pattern. For example, the arrangement for four dots is usually in a square formation; the arrangement for six dots is usually in two parallel vertical rows of three dots.

Hence, an input key 18a designated for the value of "four" is identifiable by the pattern symbol ": :", which is the same pattern symbol revealed on the particular dominos tile. The numerical value shown on the display screen 14, however, will be identifiable by the corresponding numeral symbol. For example, when a player actuates the input key 18a having the pattern symbol ": :", the display screen will reveal the numeral symbol "4", as shown in FIG. 2. Hence, when a player is tabulating the score or value of the dominos game tiles, the player needs only match the pattern symbols on the dominos games tiles with the corresponding pattern symbols on the input keys 18 of the calculator 10. It is contemplated that multiple values may be tabulated by using the function keys 16, as commonly performed with a calculator. Thus, when a player tabulates the score or value of dominos game tiles, the player will not be required to mentally convert or translate each pattern symbol to a numerical value and then calculate the total numerical value for each tile. Instead, the player will only need to simply actuate the input keys 18 that match the pattern symbols on the particular dominos game tiles of interest.

It is also contemplated that the input keys 18 may also have numerical value indicia on or near them, which will allow this invention to be used as a simple calculator.

Alternatively, some games tiles may be identifiable by specific colors. Hence, it is contemplated that the input keys may be color-coded such that there is a corresponding color-coded input key for each color-coded dominos game tile. Furthermore, some games may have tiles that are identifiable by specific shapes. It is also contemplated that the input keys 18 may be of particular shapes corresponding with the various shapes of the game tiles.

This invention has now been explained with reference to a specific embodiment. Other embodiments will be suggested to those of ordinary skill in the appropriate art upon review of the present specification. For example, it is anticipated that this present invention will be adaptable to using new and improved technology for constructing the dominos calculator. It is also contemplated that this present invention might have multiple player functions, as is know in the art, wherein scores for multiple players could be stored and displayable at the same time.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An electronic calculator for computing the score in the game of dominos, wherein the dominos game pieces are distinguishable by zero to a fixed quantity of pattern symbols on each piece, comprising: a. a housing; b. a display on said housing for displaying a digital score; c. function means on said housing; and d. scoring input means on said housing, wherein said scoring input means comprises a plurality of input keys displaying from zero to a fixed quantity of the pattern symbols corresponding to only a portion of the pattern symbols on the dominos game pieces and further comprises a scoring input key displaying 50 for scoring a blank portion dominos game piece.

2. An electronic calculator according to claim 1, wherein said function means comprises a plurality of function keys for performing mathematical operations with said input keys.

3. An electronic calculator for computing the score in the game of dominos, wherein the dominos game pieces are distinguishable by zero to a fixed quantity of pattern symbols on each piece, comprising: a. a housing; b. a display on said housing for displaying a digital score; c. a plurality of scoring input keys on said housing displaying from zero to a fixed quantity of pattern symbols corresponding to only a portion of the pattern symbols on the dominos games pieces and comprising a scoring input key displaying 50 for scoring a blank portion of the dominos game piece; and d. a plurality of function keys on said housing for performing mathematical operations with said scoring input keys.

4. An electronic calculator for computing the score in the game of dominos, wherein the dominos game pieces are distinguishable by a plurality of colors, comprising: a. a housing; b. a display on said housing for displaying a digital score; c. a plurality of scoring input keys on said housing wherein the scoring input keys each have a color pattern corresponding to only a portion of pattern symbols on the dominos games pieces wherein each said color pattern corresponds to a score that will be digitally displayed on said display and comprising a scoring input key displaying 50 for scoring a blank portion of the dominos game piece; and d. a plurality of function keys on said housing for performing mathematical operations with said scoring input keys.

* * * * *